United States Patent Office 2,797,186
Patented June 25, 1957

2,797,186
BIOCHEMICAL CONVERSION OF CORTISONE TO HYDROCORTISONE

Charles A. Fish, Mika Hayano, and Gregory Pincus, Worcester, Mass., assignors, by mesne assignments, to G. D. Searle & Co., Skokie, Ill., a corporation of Delaware No Drawing. Application May 21, 1953,
Serial No. 356,586

5 Claims. (Cl. 195—51)

This invention relates to processes for the preparation of hydrocortisone. In particular, it relates to processes for the conversion of cortisone to hydrocortisone by means of homogenates prepared from liver.

In accordance with the teachings of this invention, cortisone (17α-hydroxy-11-dehydrocorticosterone), having the formula

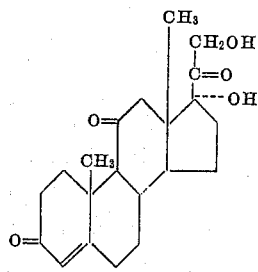

may be reduced by the introduction of hydrogen at $C_{11}$ to hydrocortisone (17α-hydroxycorticosterone), having the formula

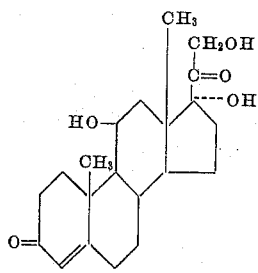

The use of cortison (and its $C_{21}$ acetate) in instances of adrenocortical insufficiency, for example, as an anti-inflammatory, anti-allergic, and anti-fibroplastic agent in diseases such as rheumatoid arthritis and rheumatic fever, is well and widely known. However, recent experimental evidence suggests not cortisone but hydrocortisone as the principal glycogenic steroid secreted by the adrenal cortex; and under conditions of stress, the latter participates even more than cortisone in physiologic reactions. Moreover, current studies indicate that, milligram for milligram, hydrocortisone has greater physiologic potency than cortisone. Thus, when injected locally, hydrocortisone is much more effective than cortisone in suppressing the synovial inflammation of rheumatoid arthritis. Additionally, comparisons made from muscle work tests, assays of liver glycogen, and ability to incite regressive changes in the thymus and adrenals, have shown that when the two hormones are given intravenously or subcutaneously, hydrocortisone is approximately twice as potent as cortisone. It appears, further, that one-half as much hydrocortisone as cortisone will promote an equivalent eosinopenic response. In view of the foregoing advantages of hydrocortisone as compared to cortisone, both with respect to its greater degree of therapeutic effectiveness and also with regard to the lesser undesirable side actions encountered in its use, the utility of the present new process for the preparation of this material is manifestly very great.

It has been known for many years that the liver plays a significant part in the enzymatic oxidation of lower fatty acids, sugars, and amino acids—the compounds from which energy is derived in living tissues. Such biological oxidations proceed in many instances by means of hydrogen transfer—a term having reference to the fact that whenever one substance is oxidized, another substance is reduced. We have now discovered that the liver, beyond and quite apart from its normal biological function in the metabolic processing within the animal body of the aforesaid fats, carbohydrates, and proteins, will—surprisingly—serve in vitro to effect hydrogen transfer in the disrelated and heretofore untried liver-enzyme-substrate, cortisone. In accordance with our discovery, liver homogenates prepared and used as disclosed herein will effect the partial reduction of the $C_{11}$ oxygen atom of cortisone, converting the said cortisone to the ofttimes more desirable hydrocortisone. Thus the present invention affords a new and better route to a compound of great therapeutic value, the chemical derivation of which has long been a problem.

By our procedure, mammalian liver—such as pig, cattle, or rat liver—is sliced, chopped, hashed, minced, ground, comminuted, or otherwise homogenized—usually in the presence of a dilute salt solution, such as 0.1 M phosphate buffer—and the resultant mixture is clarified by straining, centrifuging, or the equivalent, to remove gross tissue particles. Alternatively, the homogenate may be employed without clarifying treatment. The homogenate is combined with the cortisone to be reduced, the latter being preferentially introduced in solution—for example, dissolved in propylene glycol. The pH at which incubation may satisfactorily be carried out varies widely, ranging in the course of casual observation from as low as 5.8 to upwards of 8.4. Where pig liver is used, 6.4 is a preferred pH value. An exogenous source of hydrogen may be incorporated with the homogenate also, 0.1 M sodium succinate or sodium ascorbate being effective for this purpose. Cysteine, citric and fumaric acids, and glutamic acid-nicotinamide are other hydrogen donors which may ofttimes be used with advantage. The mixture thus obtained is incubated—generally with agitation—at temperatures below about 50° centigrade for periods of time optimally ranging between ½ and 2 hours. Longer incubation periods (2 to 4 hours) are operable but tend to bring about reduction in ring A, and are therefore ordinarily avoided. The incubation product is extracted—either directly, or from the dialysate following 72 hours dialysis against cold tap water—into a suitable solvent such as chloroform, methylene chloride, ethylene dichloride, benzene, or the like. The extract is evaporated to dryness and then treated to remove fat, for example, by partitioning between petroleum ether and 70% methyl alcohol, following which the alcohol layer is freed of solvent by vacuum distillation, and the residual aqueous phase is then extracted with a water-immiscible solvent such as chloroform, methylene chloride, ethylene dichloride, benzene, or the like. The solvent is once again removed by vacuum distillation, whereupon the residue is chromatographed on silica gel—using benzene and ethyl acetate as developing solvents—to give the desired hydrocortisone as a pure product.

Widely varying tissue-steroid ratios are operable in our process. However, a preferred ratio lies in the range between 100 and 2000 parts of tissue for each part of steroid to be reduced.

The following examples will illustrate in detail the methods which constitute the present invention. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in grams (gm.), milligrams (mg.), and milliliters (ml.), except as otherwise noted. The symbol "M" refers to molar, a term used to designate a solution containing one mole of substance in 1000 ml. of solution. The symbol "mµ" refers to millimicron, a unit of wave length.

*Example 1*

A mixture of 72 gm. of pig liver and 120 ml. of 0.1 M phosphate pH 7.4 buffer is minced in a Waring Blendor and the resultant homogenate is strained through gauze and divided into 10 equal parts, to each of which is added 4 ml. of 0.1 M sodium succinate adjusted to a pH of 7.4, and 5 mg. of cortisone dissolved in 0.3 ml. of propylene glycol. (The propylene glycol steroid solution is prepared with the aid of acetone, the acetone being removed by heating in vacuo.) Incubation is carried out at 38° C. for one hour in air, the incubates being shaken in process. The incubation products are combined and extracted into chloroform, and the chloroform solution is then evaporated to dryness in vacuo. The residue is taken up in 70% aqueous methyl alcohol and extracted several times with petroleum ether to remove fatty material. Methyl alcohol is removed from the solution by vacuum distillation, whereupon the residual aqueous phase is extracted with chloroform. The chloroform solution is evaporated to dryness in vacuo, and finally the residue is chromatographed on silica gel using benzene and ethyl acetate as developing solvents. From the fractions showing green fluorescence on treatment with concentrated sulfuric acid, material melting at 206–209° C. is crystallized. This material is hydrocortisone. Ultraviolet absorption spectra of the sulfuric acid chromogens of both the subject product and of a reference sample of cortisone are identical, showing peaks at 282, 392, and 474 mµ.

*Example 2*

A mixture of 3 gm. of rat liver, and 2 ml. each of physiologic saline solution and 0.1 M sodium succinate, is homogenized in a Potter-Elvehjem apparatus, working in a cold room near 0° C. The homogenate is filtered through cheese cloth and to the filtrate is added 5 ml. of phosphate pH 7.2 buffer and 5 mg. of cortisone dissolved in 0.3 ml. of propylene glycol. The materials are incubated in the open air for 1½ hours at 37° C. The incubation product is dialyzed against tap water in the cold (2 to 7° C.) for three days, the dialysate being twice changed in process. The combined dialysates are extracted into chloroform, and the chloroform extract is then evaporated to dryness in vacuo. Following chromatographic absorption on silica gel using benzene and ethyl acetate as developing solvents, the desired hydrocortisone may be isolated in good yield and, crystallized from isopropyl alcohol, shows M. P. 212–215° C.

We claim:

1. The method of preparing hydrocortisone which comprises subjecting cortisone to the action of homogenized liver.
2. The method of preparing hydrocortisone which comprises incubating cortisone with homogenized liver in air at temperatures below about 50° C.
3. The method of preparing hydrocortisone which comprises incubating a cortisone-containing liquid with homogenized liver in air at about 38° C.
4. The method of preparing hydrocortisone which comprises incubating homogenized liver and a solution of cortisone at 38° C. in air, using sodium succinate as a source of hydrogen.
5. The method of preparing hydrocortisone which comprises incubating homogenized liver and a solution of cortisone at 38° C. in air, using sodium ascorbate as a source of hydrogen.

References Cited in the file of this patent

Seneca et al.: Science, vol. 112, pages 524–525 (Patent Office Scientific Library: Q–1–S34).

Eisenstein: Science, vol. 116, November 14, 1952, pages 520–521. Copy in Scientific Library. 195–51 Steroid.

Schneider et al.: J. of Biological Chemistry, vol. 196–#2, June 1952, pages 629–639. Copy in Scientific Library. 195–51 Steroid.

Hayano et al.: Proc. Soc. Expt. Biol. and Medicine, vol. 72, December 1949, pages 700–701. Copy in Scientific Library. 195–51 Steroid.